Feb. 24, 1948. T. McCULLOCH 2,436,657
EXTENSIBLE CONVEYOR OF THE ENDLESS BELT TYPE
Filed April 17, 1946 2 Sheets-Sheet 1

Thomas McCulloch
INVENTOR
By [signature]
his ATTY.

Feb. 24, 1948.  T. McCULLOCH  2,436,657
EXTENSIBLE CONVEYOR OF THE ENDLESS BELT TYPE
Filed April 17, 1946  2 Sheets-Sheet 2

Thomas McCulloch
INVENTOR
By [signature]
his ATTY.

Patented Feb. 24, 1948

2,436,657

UNITED STATES PATENT OFFICE 2,436,657

EXTENSIBLE CONVEYOR OF THE ENDLESS BELT TYPE

Thomas McCulloch, Glasgow, Scotland, assignor to Mavor & Coulson, Limited, Glasgow, Scotland Application April 17, 1946, Serial No. 662,846
In Great Britain February 12, 1944

Section 1, Public Law 690, August 8, 1946
Patent expires February 12, 1964

4 Claims. (Cl. 198—139)

This invention refers to conveyors of the endless belt type, more particularly conveyors for use underground in mines.

Belt conveyors are often employed in circumstances in which it is necessary frequently to extend or contract the conveyor lengthwise. To permit of this being readily effected, the return (that is, the non-conveying) run of the conveyor may be formed into a loop over idler pulleys. By reducing or increasing the size of the loop, the operator of the conveyor is enabled to extend or contract the length of the conveyor without inserting or removing lengths of conveyor belting. The size of the loop is varied by longitudinal movement of one of the idler pulleys, this pulley applying the necessary tension to the conveyor. When effecting such longitudinal movement the pulley may tend to become mis-aligned that is to say out of parallelism with the other pulleys, it being essential that the pulley axis shall maintain the proper transverse relationship with the conveyor.

The chief object of this invention is to provide improved means for regulating the longitudinally movable pulley so that it maintains parallelism with the other pulleys, that is maintains the proper transverse relationship with the conveyor.

Another object of the invention is to effect regulation of the longitudinally movable pulley by means of ropes or like flexible ties led round pulley wheels or equivalent side guides to compensating drums operated through self-sustaining mechanism; that is, mechanism which retains them locked against their load except when the operator turns them.

Another object is to provide for the work of regulation, compensating drums on the same axis and rotatable both in the same direction, the ties to be wound on to them in opposite directions.

Other objects of the invention will be apparent from the accompanying drawings, in which—

Figure 1:
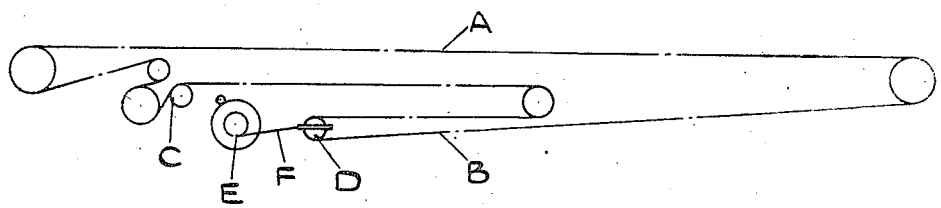

Figure 1 is a diagrammatic view showing a belt conveyor according to the invention with a loop of adjustable size and a tensioning winch.

Figure 4:
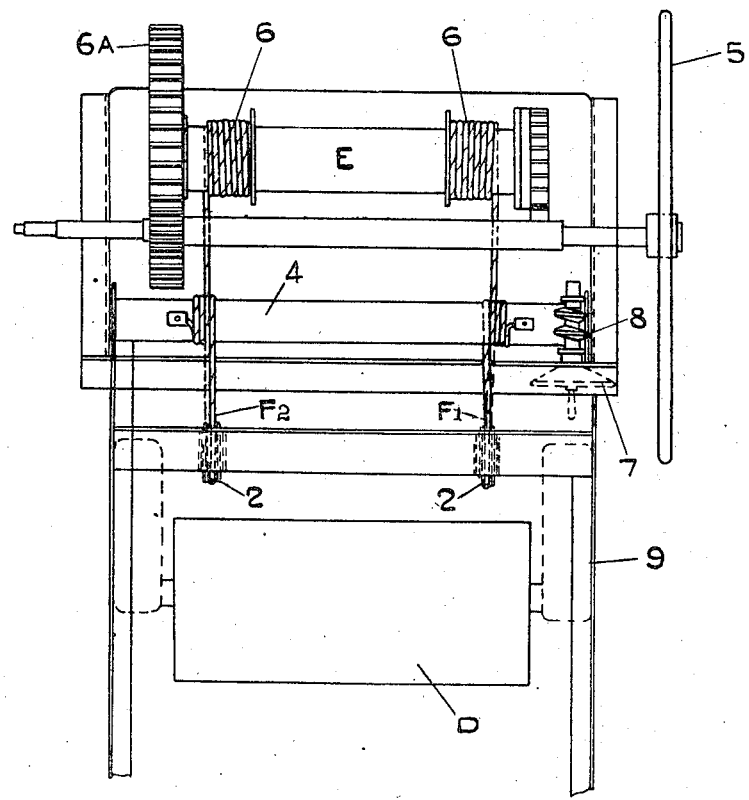
Figure 2:
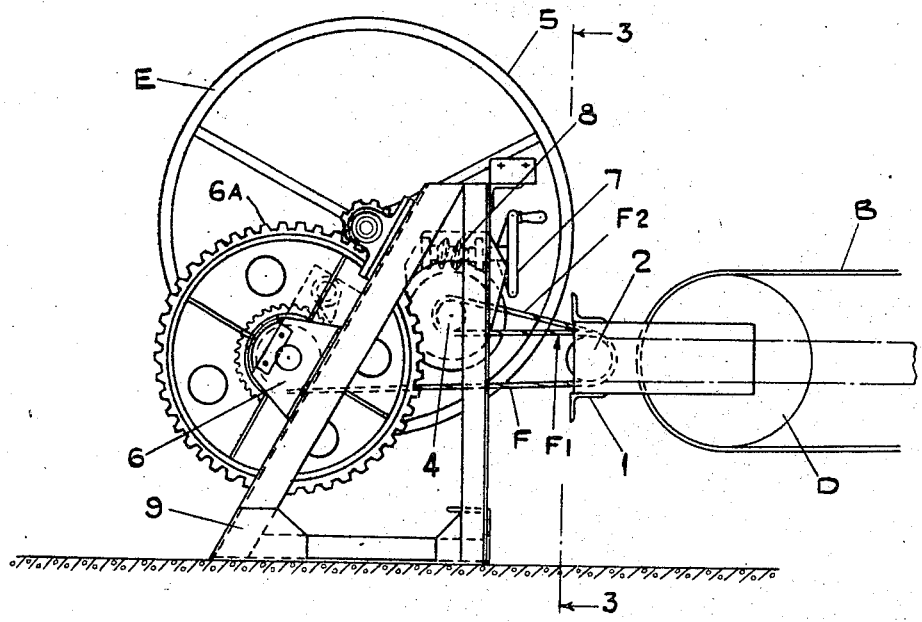
Figure 3:
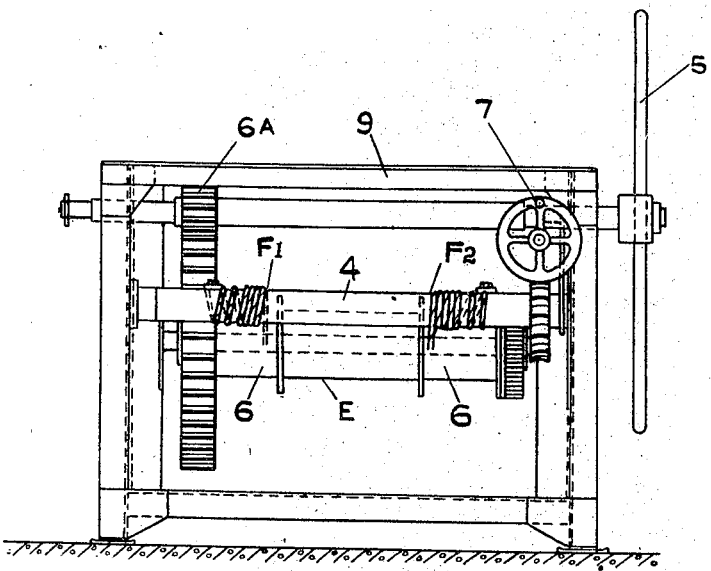

Figure 2 is a side view of a practical construction of the belt conveyor showing the compensating gear. Figure 3 is an end view on the line 3—3 of Figure 2. Figure 4 is a plan view.

Figure 1 shows an endless belt conveyor A with a loop B of adjustable size and driving gear C, both in its non-conveying run. The conveyor-tensioning pulley which holds the loop is indicated at D, being movable longitudinally, and a hand-operated winch which controls the position of the pulley is indicated at E. The bearings of the pulley D are provided in a part connected to the winch by ropes F, one at each side. In Figure 1, for simplicity, only one of the ropes F is shown. The action of the winch, as usual in such conveyors, is to pull the pulley D nearer to the winch in order to lengthen the loop B, or release the pulley D so that it will recede from the winch in order to shorten the loop B, the winch serving at the same time to apply the necessary tension to the belt A.

Referring now to Figures 2, 3 and 4, the tension roller D is journalled at opposite sides of the conveyor A in bearings (not shown) forming parts of a frame 1, which is slidable longitudinally in the conveyor structure in known manner. This sliding movement of the frame 1 is effected when the tension of the conveyor has to be adjusted and when the size of the loop B has to be altered in the work of altering the length of the conveyor.

The frame 1 is provided also with pulley wheels 2, one at each side. Associated with the winch E is a double compensating drum 4 consisting of two individual rope-winding drum parts, one at each side. The winch has a double rope-winding drum 6, being operated through pinion gearing 6A from a hand wheel 5. The compensating drum is rotatable by hand from a hand wheel 7 geared to the drum through worm and worm wheel gearing 8. The compensating drum, the winch and their respective operating means are all mounted in a rigid supporting structure 9.

One of the two tensioning ropes F is wound on to the winch drum and passes from the underside of the winch drum to the corresponding pulley wheel 2 under and over which the rope passes. From the pulley wheel 2 a stretch $F_1$ of the rope is led to the compensating drum on to which it is wound from the underside of that drum and secured thereon. The other rope F also passes from the underside of the winch drum under and over the corresponding pulley wheel whence a stretch $F_2$ of the rope is wound on to the compensating drum from the top and is secured thereon. Thus, it will be manifest that the stretches $F_1$ and $F_2$ are wound on the respective parts of the drum 4 to opposite hands.

In order to effect or permit movement of the pulley D longitudinally of the conveyor, the wince E is operated by appropriate turning of the wheel 5.

Should there be any out-of-parallelism of the tension roller D it can be corrected by turning the hand wheel 7 operating the compensating drum 4, which has the effect of paying out rope on one side and winding in rope on the other side. The use of the worm and worm wheel gearing renders the compensating gear self-locking under load, the gear being non-reactive to tension in the stretches $F_1$ and $F_2$ of the rope.

The hand wheel 5 for operating the winch can be transferred to the other side of the gear; see Figures 3 and 4.

Chain may, of course, be used instead of rope.

I claim:

1. In a lengthwise extensible belt conveyor having a loop of adjustable size, a pulley holding said loop and journalled in a movable frame and a winch for controlling the longitudinal position of the frame in order to extend or contract the conveyor, means to maintain said pulley in proper transverse relationship with the conveyor comprising two pulley wheels at opposite sides of said frame, two conveyor-tensioning ties wound on said winch at opposite sides thereof and led therefrom round said pulley wheels respectively, a pair of compensating drums mounted in association with said winch, means for turning said drums independently of said winch, and stretches of said ties extending from said pulley wheels to said drums and being wound thereon oppositely so that when the drums are turned one tie is paid out and the other is wound in.

2. In a lengthwise extensible belt conveyor having a loop of adjustable size, a pulley holding said loop and means for controlling the longitudinal position of the pulley in order to extend or contract the conveyor, means for regulating said pulley comprising side guides movable longitudinally with said pulley, two conveyor-tensioning ties attached to said controlling means and led therefrom to said guides respectively, compensating drums mounted in association with said controlling means, means for turning said drums, and stretches of said ties extending from said side guides to said drums and being wound thereon oppositely so that when the drums are turned one tie is paid out and the other is wound in.

3. In a lengthwise extensible belt conveyor having a loop of adjustable size, a pulley holding said loop and journalled in a movable frame and means for controlling the longitudinal position of the frame in order to extend or contract the conveyor, means to maintain said pulley in proper transverse relationship with the conveyor comprising two pulley wheels at opposite sides of said frame, two conveyor-tensioning ties attached to said controlling means and led therefrom round said pulley wheels respectively, a pair of compensating drums mounted in association with said controlling means, non-reactive worm gear mechanism for turning said drums, and stretches of said ties extending from said pulley wheels to said drums and being wound thereon oppositely so that when the drums are turned one tie is paid out and the other is wound in.

4. In a lengthwise extensible belt conveyor having a loop of adjustable size, a pulley holding said loop and journalled in a movable frame and a winch for controlling the longitudinal position of the frame in order to extend or contract the conveyor, means to maintain said pulley in proper transverse relationship with the conveyor comprising pulley wheels at opposite sides of said frame, conveyor-tensioning ties wound on said winch and led therefrom round said pulley wheels respectively, a pair of compensating drums forming parts of a rotatable unit mounted in association with said winch, means for turning said unit independently of said winch, and stretches of said ties extending from said pulley wheels to said drums and being wound thereon to opposite hands so that when the unit is turned one side is paid out and the other is wound in.

THOMAS McCULLOCH.

REFERENCES CITED

The following references are of record in the file of this patent:

UNITED STATES PATENTS

| Number | Name | Date |
| --- | --- | --- |
| 269,561 | Cortelyou | Dec. 26, 1882 |

FOREIGN PATENTS

| Number | Country | Date |
| --- | --- | --- |
| 323,655 | Great Britain | Jan. 9, 1930 |